US006760415B2

(12) United States Patent
Beecroft

(10) Patent No.: US 6,760,415 B2
(45) Date of Patent: *Jul. 6, 2004

(54) VOICE TELEPHONY SYSTEM

(75) Inventor: Troy C. Beecroft, Westminster, CO (US)

(73) Assignee: Qwest Communications International Inc., Denver, CO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 230 days.

(21) Appl. No.: 09/527,709

(22) Filed: Mar. 17, 2000

(65) Prior Publication Data

US 2002/0061095 A1 May 23, 2002

(51) Int. Cl.[7] .................................................. H04B 1/00
(52) U.S. Cl. ............................... 379/110.01; 379/93.17; 379/93.23; 379/102.03
(58) Field of Search ..................... 379/110.01, 90.01, 379/93.05, 93.06, 93.17, 93.23, 102.03; 348/14.01, 14.02, 14.03, 14.04, 14.05, 14.06, 14.07, 14.08, 14.09; 345/348; H04N 7/14

(56) References Cited

U.S. PATENT DOCUMENTS 5,963,245 A * 10/1999 McDonald ............... 348/14.01
5,999,207 A * 12/1999 Rodriguez et al. ....... 348/14.03
6,359,636 B1 * 3/2002 Schindler et al. .......... 345/846

FOREIGN PATENT DOCUMENTS

JP         361260783 A * 11/1986   ............ H04N/7/14

* cited by examiner

Primary Examiner—Melur Ramakrishnaiah
(74) Attorney, Agent, or Firm—Townsend and Townsend and Crew LLP

(57) ABSTRACT

A voice telephony system integrates voice telephony technology with television programming via a visual interface for a telephony device operating in a speakerphone mode. The visual interface indicates a status of the telephony device to a user, and is displayed by a video processing device connected to the television.

18 Claims, 3 Drawing Sheets

VOICE TELEPHONY SYSTEM

TECHNICAL FIELD

The present invention relates to a voice telephony system for integrating voice telephony functionality with television programming on a television when a user participates in a telephone call.

BACKGROUND ART

Traditionally, a person or telephone system user has a telephone at his or her home that is mounted on a wall or that sits on a table. The telephone is connected by a telephone wire to a standard telephone wall jack. Wiring within the home walls connects the various telephones to one or more telephone lines that connect to telephone company telephone lines at a network interface just outside of the home. The telephone company wires connect the home network interface to the public switched telephone network. In general, an incoming call causes the telephone or telephones within the home to ring, until the call is answered by the user or by an answering machine.

Because the telephone service industry is becoming more and more competitive, some attempts have been made to add functionality to the traditional telephone. For example, caller identification devices are now available that allow the telephone user to identify an incoming caller without answering the telephone. Some of these units identify the caller by telephone number, while others further identify the caller with a name from a telephone directory listing. Still, a ringing telephone is an inconvenience for some users. For example, a ringing telephone, indicating an incoming call, interrupts the user from whatever activities he or she is engaged in, forcing the user to walk over to the telephone and either answer it, screen the call by listening to an answering machine as the machine records, or check a caller identification unit if one is connected to the phone to determine who is calling. So, even though there are existing techniques that allow a user to identify the identity of an incoming caller, existing techniques are still rather obtrusive because the user is forced to disengage any current activities to walk over to the ringing telephone.

For the foregoing reasons, there is a need for a voice telephony system that enhances telephone functionality in a way to make incoming calls less obtrusive to the person receiving the incoming call at his or her home.

DISCLOSURE OF INVENTION

It is, therefore, an object of the present invention to provide a voice telephony system for integrating voice functionality with television programming on a television when a user participates in a telephone call, that utilizes a visual interface indicating a status of the telephony device to the user.

In carrying out the above object, a voice telephony system for integrating voice telephony functionality with television programming on a television when a user participates in a telephone call is provided. The system comprises a voice telephony device and a video processing device. The voice telephony device is operable in a speakerphone mode. The video processing device has an input connected to a video source and a video output connected to the television to display television programming from the video source. The video processing device is in communication with the telephony device and is configured to display a visual interface for the telephony device. The visual interface is displayed when the telephony device operates in the speakerphone mode. The visual interface indicates a status of the telephony device to the user.

In a preferred implementation, the visual interface includes an icon that is displayed along with the television programming, possibly in a corner of the viewing area. In a suitable implementation, the telephony device has an on-hook status and an off-hook status. The icon has a dim state and a lit state. The icon is in the dim state when the telephony device status is on-hook and the icon is in the lit state when the telephony device status is off-hook. Further, in a suitable implementation, the visual interface has a minimized view and an expanded view. The icon represents the visual interface in the minimized view. Preferably, the icon is a minimized phone, and the visual interface includes an expanded phone widget that represents the visual interface in the expanded view. Preferably, the expanded phone widget includes a keypad interface to simulate a physical telephone keypad.

In one suitable implementation, the video processing device is operable to display a television programming screen in which television programming from the video source is displayed and is operable to display a main screen in which the telephony device visual interface is displayed. The main screen may be, for example, an initial screen that is displayed when the video processing device is turned on. The visual interface is displayed on a television programming screen during the presence of a telephone call, but is preferably always displayed on the main screen. Optionally, the visual interface could be always displayed on the television programming screen, if desired by the user.

In preferred embodiments, the visual interface includes a call notification message that is displayed along with the television programming in the presence of an incoming telephone call. Preferably, the call notification message includes a caller identification. Preferably, the call notification message includes an answer button. The answer button may be selected by the user with a remote control. When the user selects the answer button, the telephony device operates in the speakerphone mode and displays an icon in a corner of the viewing area of the television programming to indicate that the speakerphone is in use. Further, the call notification message may include an ignore button that may be selected to dismiss the call notification message.

Further, in carrying out the present invention, a voice telephony system for integrating voice telephony functionality with television programming on a television when a user participates in a telephone call is provided. The system comprises a voice telephony device, and a video processing device. The voice telephony device is operable in a speakerphone mode. The video processing device has an input connected to a video source and a video output connected to a television to display television programming from the video source. The video processing device is in communication with the telephony device and is configured to display a visual interface for the telephony device to indicate a status of the telephony device to the user. A visual interface has a minimized view represented by an icon that indicates the telephony device status and an expanded view represented by an expanded phone widget that allows the user to control the telephony device with a remote control unit.

Preferably, the expanded phone widget includes a keypad interface. Further, in a preferred embodiment, the videoprocessing device is operable to display a television programming screen in which television programming from the video source is displayed, and is operable to display a main screen in which the telephony device visual interface is displayed. That is, at the main screen, the visual interface, by default, is always displayed. In the television programming screen, the visual interface is displayed during the presence of a telephone call.

Preferably, the visual interface includes a call notification message that is displayed along with the television programming in the presence of an incoming telephone call. Further, the call notification message includes a caller identification. More preferably, the call notification message includes an answer button that may be selected with the remote control. In response to the user selecting the answer button, an icon is displayed along with the television programming and the telephony device is operated in the speakerphone mode. The icon reminds the user that speakerphone is activated. An ignore button may be selected by the user to dismiss the call notification message.

The advantages associated with embodiments of the present invention are numerous. For example, preferred embodiments of the present invention provide a pop-up user interface for integrating speakerphone functionality with television programming. A phone icon is displayed on the television screen to indicate speakerphone status. A user may select the icon in order to reveal an expanded user interface with additional speakerphone functionality. The expanded interface includes, for example, a numeric keypad, dial and hang up buttons, flash, mute, and hold buttons, etc. Advantageously, speakerphone functionality is integrated with television viewing in an unobtrusive manner. The home telephone user may be notified of an incoming call by the appearance of the call notification message in a small portion of the television viewing area. Advantageously, the telephone ringer may be turned off so that the only intrusion is the appearance of the call notification message. Further, the home user may, in preferred embodiments, select to answer or ignore the call with a remote control. The remote control could be the normal remote control associated with the videoprocessing device. Even further, because speakerphone functionality is integrated with the television interface, the home user may activate the speakerphone with the pressing of a single button.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
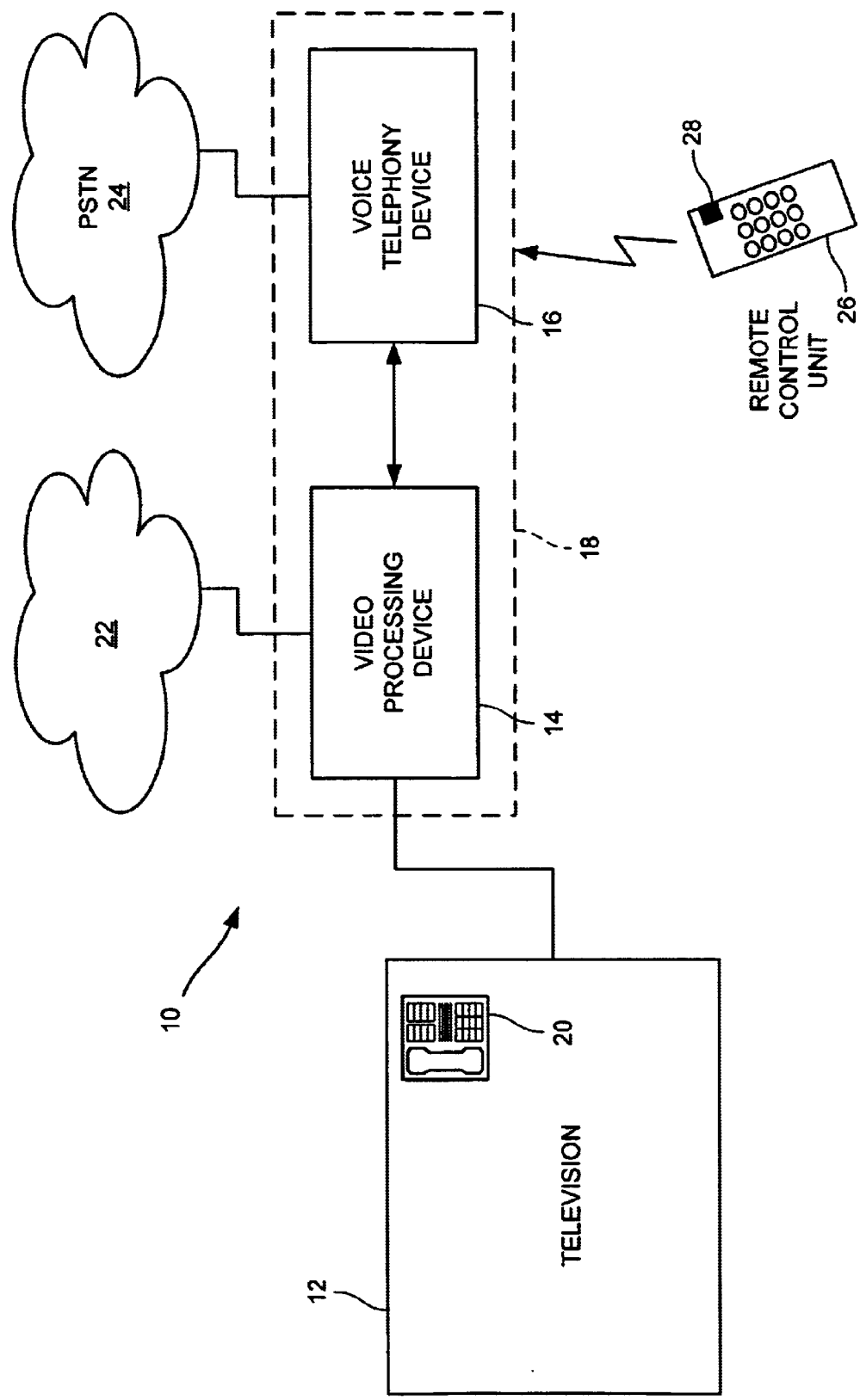
FIG. 1 is a block diagram illustrating a voice telephony system of the present invention for integrating voice telephony functionality with television programming.

With reference to FIG. 1, a voice telephony system of the present invention is generally indicated at 10. A television 12 is connected to a video processing device 14. The video processing device is in communication with a voice telephony device 16. Video processing device 14 and voice telephony device 16 may be integrated as a set top box 18. Alternatively, video processing device 14 and voice telephony device 16 may be separate devices connected together with a wire or wireless data link. Further, voice telephony device 16 includes a microphone and speaker for speakerphone operation. The microphone and speaker may be physically connected with other components of voice telephony device 16, or, may be located remotely and communicate over a wire or wireless link. For example, in embodiments with voice telephony device 16 and video processing device 14 integrated as a set top box 18, a microphone and speaker may be located remotely, in the television viewing area, so that the microphone and speaker are closer to the home user during the phone call. Still further, system 10 includes remote control unit 26 for controlling video processing device 14 to select programming for display on television 12. In an alternative embodiment, the microphone and speaker may be integrated in remote control unit 26. Further, the remote control may include special buttons for the telephony functions. Alternatively, the telephony functions may be selected with ordinary menu scrolling and selection buttons that are commonly included in a remote control unit.

As shown, video processing device 14 is connected to network 22 for receiving video programming. Video processing device 14 may connect to an antenna, a cable network, or any other network that provides video programming to video processing device 14. Voice telephony device 16, as shown, is connected to the public switched telephone network 24. Of course, voice telephony device 16 could be connected to any suitable telephony channel, and the connection to a traditional landline PSTN phone line is exemplary only. As shown on television 12, the phone icon 20 is present when the speakerphone is in use. In a preferred implementation, button 28 (or other additional buttons) on remote control 26 are used to interact with the video processing device 14 and control telephone functionality at voice telephony device 16.

Figure 2:
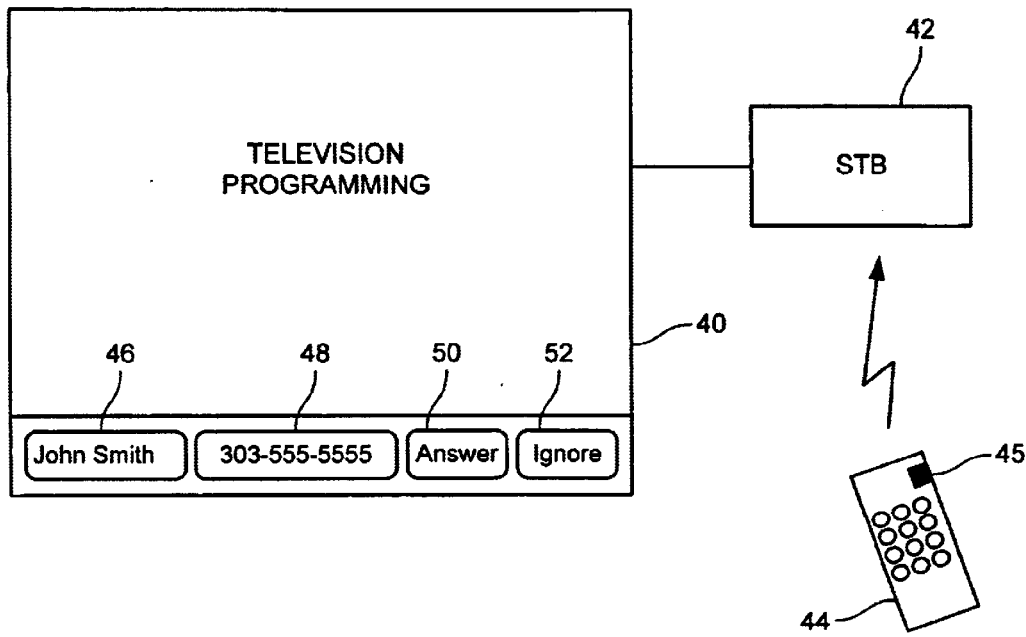
FIG. 2 is a television, set top box, and remote control, and illustrates the call notification message.
Figure 3:
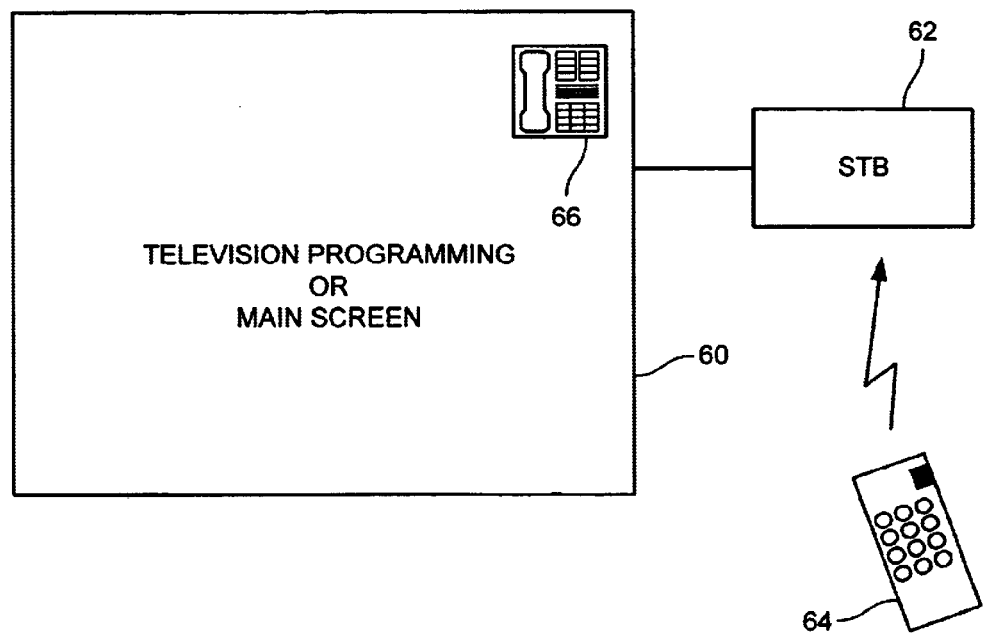
FIG. 3 is a television, set top box, and remote control, and illustrates the minimized phone widget.
Figure 4:
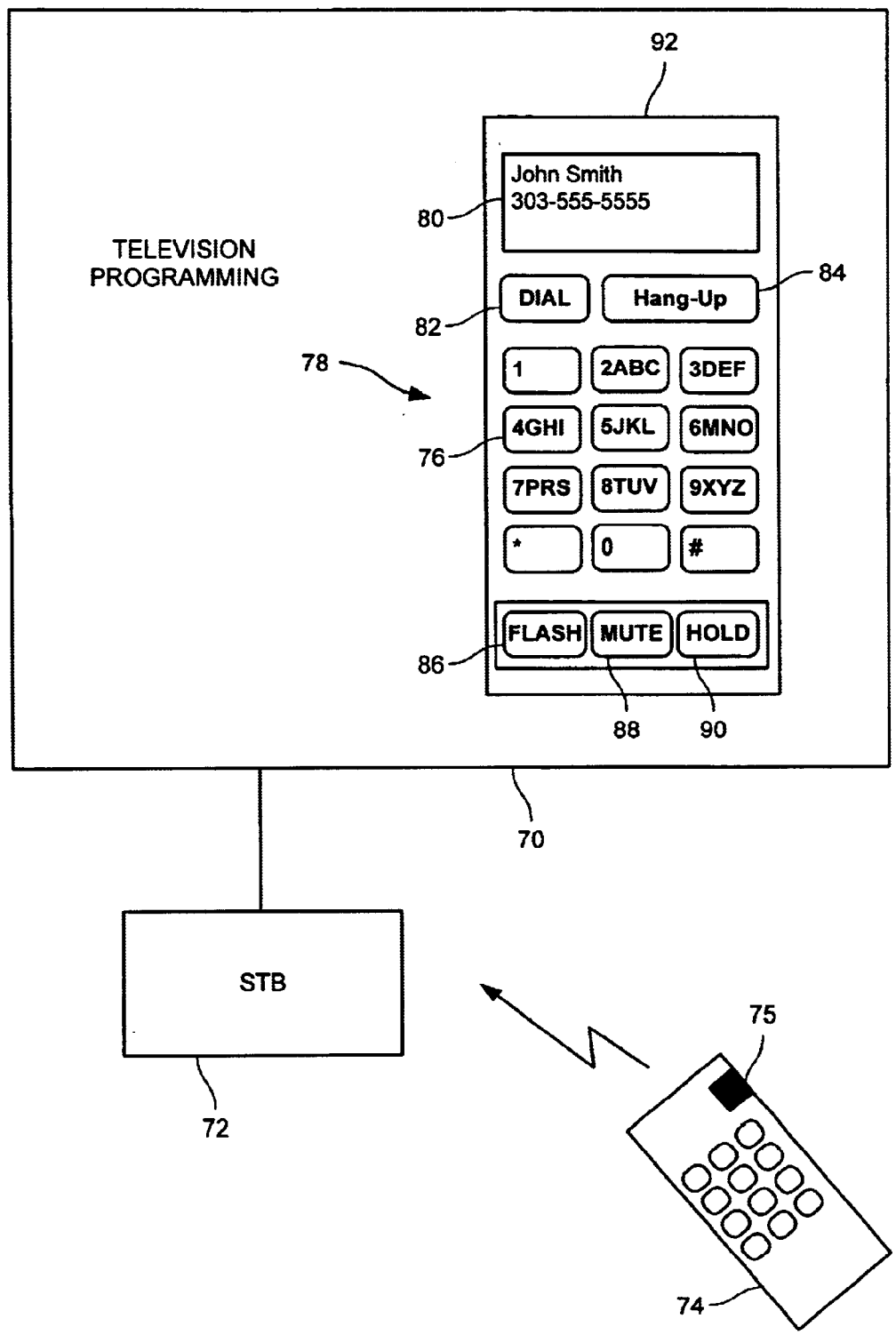
FIG. 4 is a television, set top box, and remote control, and illustrates the expanded phone widget.

FIGS. 2–4 illustrate an example of voice telephony system 10 in use. In a preferred embodiment, the speakerphone user interface includes a widget that has two fundamental states, namely, minimized and expanded. The minimized state, represented by an icon, serves as a starting point for accessing the speakerphone user interface. The icon also serves as an off-hook indicator when the speakerphone is in use. The expanded state provides a full range of speakerphone functions in a familiar device-like user interface.

The minimized phone widget is shown at 20 in FIG. 1, and at 66 in FIG. 3. The phone widget appears, by default, in its minimized state on the main screen of the user interface for the set top box. As mentioned previously, the main screen could be an initial screen when the video processing device is turned on. The initial screen has a menu driven interface that allows the user to highlight and select items with the remote control unit. By default, the minimized phone widget is always present on the main screen, and when a call is in progress, appears in a lit up state representing that the phone is in an off-hook state.

Besides appearing on the main screen, the minimized widget appears on the TV screen if a call was answered while watching TV. The presence of the icon serves as a reminder of the speakerphone status, as well as placing the full functionality of the speakerphone at the user's fingertips via the expanded widget.

The expanded phone widget in the preferred embodiment, in addition to displaying on-hook or off-hook state (for example, with dim and lit states), provides a user interface for controlling basic speakerphone operations that is reminiscent of an actual phone. The expanded version of the user interface can be minimized again by selecting a small button at the top of the widget (92, FIG. 4).

With reference to FIG. 2, a typical usage scenario for the speakerphone widget is demonstrated. In FIG. 2, a television 40 displays television programming. Television 40 is connected to a set top box 42. A remote control unit 44 includes a plurality of buttons and a keypad, and at least one button 45 is included for controlling speakerphone functionality. Of course, button 45 need not be a button devoted to telephone functions, and may be simply another one of the buttons normally on the remote control. In FIG. 2, when a user receives a telephone call while watching television, a call notification message 46 appears on a television screen while the television programming appears in the background. In preferred embodiments, caller identification is provided at information block 48, in addition to an answer button 50 and an ignore button 52. The user chooses to answer the call by selecting answer button 50 or chooses to ignore the call by selecting ignore button 52 with remote control unit 44. Selecting the ignore button dismisses the call notification message.

In FIG. 3, when the home user answers the call, the speakerphone widget 66 appears on the television screen 60 in its minimized state. The icon is in its lit up state, indicating that the speakerphone is active. In preferred embodiments, the minimized icon is not displayed unless a speakerphone call is in progress. In the alternative, the system may be configured such that the icon is always displayed, displayed as a dim icon when the speakerphone is not in use and as a lit up icon when speakerphone is in use. In FIG. 3, television 60 is connected to set top box 62, which is controlled by remote control unit 64.

Continuing with the example, and with reference to FIG. 4, the home user may expand the minimized icon to display the expanded speakerphone widget, generally indicated at 78. The widget may be expanded by, for example, pressing button 75 on remote control unit 74. In FIG. 4, television 70 is connected to set top box 72, which receives the signals from remote control unit 74. The expanded speakerphone widget preferably provides all the functionality of the telephony device. The expanded widget 78 includes a numeric keypad 76, a caller identification display 80, a dial button 82, a hang up button 84, in addition to flash, mute, and hold buttons, 86, 88, 90, respectively. For example, to initiate a three-way call, the home user selects the minimized widget icon (66, FIG. 3). The expanded version of the speakerphone widget then appears, as shown in FIG. 4. Once the expanded icon appears, the user may access the various functions of the telephony device. Once the call has ended, the speakerphone widget preferably disappears from the television display (but can be invoked again with a key press, and is always present on the main screen).

It is to be appreciated that embodiments of the present invention provide a voice telephony system for integrating voice telephony functionality with television programming and a television when a user participates in a telephone call. Advantageously, the video processing device is in communication with the telephony device, possibly with both devices integrated within a set top box, and a visual interface indicates a status of the telephony device to the user. In preferred embodiments, the visual interface includes an icon representing a minimized view, and an expanded phone widget representing the visual interface in an expanded view. The expanded view provides full access to the various functions of the telephony device. Preferably, the visual interface is only displayed during television programming when the speakerphone is in use, but is always displayed on a main screen. It is appreciated that various techniques may be used to indicate telephone call status with the visual interface. For example, dim and lit icons may be used to indicate on and off hook status for the telephone. In accordance with the present invention, the pop-up user interface integrates speakerphone functionality with television programming. With integrated speakerphone functionality integrated with television viewing, the home user may be notified of incoming calls in an unobtrusive manner.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A voice telephony system for integrating voice telephony functionality with television programming on a television when a user participates in a telephone call, the system comprising:

a voice telephony device, connected to a public switched telephone network, operable in a speakerphone mode;

a video processing device, connected to a television programming network that is separate from the public switched telephone network, having an input connected to a video source and a video output connected to the television to display television programming from the video source, wherein the video processing device is in communication with the telephony device and is configured to display a visual interface for the telephony device when the telephony device operates in the speakerphone mode, the visual interface indicating a status of the telephony device to the user, the status being either an on-hook status when the telephony device is not in use or an off-hook status when the telephony device is in use, the visual interface further having a minimized view and an expanded view; and a remote control unit including a keypad for controlling the video processing device, the keypad including at least one key for controlling the telephony device and including a microphone and speaker, wherein the remote control unit communicates with the voice telephony device to use the remote control unit microphone and speaker when the telephony device operates in the speakerphone mode.

2. The system of claim 1 wherein the visual interface includes an icon that is displayed along with the television programming.

3. The system of claim 2 wherein the icon represents the visual interface in the minimized view and has a dim state and a lit state, and the icon is in the dim state when the telephony device status is on-hook and the icon is in the lit state when the telephony device status is off-hook.

4. The system of claim 3 wherein the icon is a minimized phone widget, and wherein the visual interface includes an expanded phone widget that represents the visual interface in the expanded view.

5. The system of claim 4 wherein the expanded phone widget includes a keypad interface.

6. The system of claim 1 wherein the video processing device is operable to display a television programming screen in which television programming from the video source is displayed and is operable to display a main screen in which the telephony device visual interface is displayed, and wherein the visual interface is further displayed on the television programming screen during the presence of a telephone call.

7. The system of claim 6 wherein the visual interface includes an icon that is displayed along with the television programming.

8. The system of claim 1 wherein the visual interface includes a call notification message that is displayed along with the television programming in the presence of an incoming telephone call.

9. The system of claim 8 wherein the call notification message includes a caller identification.

10. The system of claim 8 wherein the call notification message includes an answer button, and wherein the visual interface includes an icon that is displayed along with the television programming in response to the user selecting the answer button, and wherein the telephony device operates in the speakerphone mode in response to the user selecting the answer button.

11. The system of claim 8 wherein the call notification message includes an ignore button, and wherein the call notification message is dismissed in response to the user selecting the ignore button.

12. A voice telephony system for integrating voice telephony functionality with television programming on a television when a user participates in a telephone call, the system comprising:

a voice telephony device, connected to a public switched telephone network, operable in a speakerphone mode;

a video processing device, connected to a television programming network that is separate from the public switched telephone network, having an input connected to a video source and a video output connected to the television to display television programming from the video source, wherein the video processing device is in communication with the telephony device and is configured to display a visual interface for the telephony device to indicate a status of the telephony device to the user, wherein the visual interface has a minimized view represented by an icon that indicates the telephony device status and an expanded view represented by an expanded phone widget that allows the user to control the telephony device with a remote control unit for the video processing device; and a remote control unit including a keypad for controlling the video processing device, the keypad including at least one key for controlling the telephony device and including a microphone and speaker, wherein the remote control unit communicates with the voice telephony device to use the remote control unit microphone and speaker when the telephony device operates in the speakerphone mode.

13. The system of claim 12 wherein the expanded phone widget includes a keypad interface.

14. The system of claim 12 wherein the video processing device is operable to display a television programming screen in which television programming from the video source is displayed and is operable to display a main screen in which the telephony device visual interface is displayed, and wherein the visual interface is further displayed on the television programming screen during the presence of a telephone call.

15. The system of claim 14 wherein the visual interface includes a call notification message that is displayed along with the television programming in the presence of an incoming telephone call.

16. The system of claim 15 wherein the call notification message includes a caller identification.

17. The system of claim 15 wherein the call notification message includes an answer button, and wherein the visual interface includes an icon that is displayed along with the television programming in response to the user selecting the answer button, and wherein the telephony device operates in the speakerphone mode in response to the user selecting the answer button.

18. The system of claim 15 wherein the call notification message includes an ignore button, and wherein the call notification message is dismissed in response to the user selecting the ignore button.

* * * * *